United States Patent
Nye et al.

(10) Patent No.: US 7,587,532 B2
(45) Date of Patent: Sep. 8, 2009

(54) FULL/SELECTOR OUTPUT FROM ONE OF PLURAL FLAG GENERATION COUNT OUTPUTS

(75) Inventors: Jeffrey L. Nye, Austin, TX (US); Sam B. Sandbote, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 438 days.

(21) Appl. No.: 11/047,410

(22) Filed: Jan. 31, 2005

(65) Prior Publication Data

US 2006/0179186 A1   Aug. 10, 2006

(51) Int. Cl.
G06F 3/00 (2006.01)
G06F 15/167 (2006.01)
G06F 13/00 (2006.01)
G06F 9/30 (2006.01)

(52) U.S. Cl. .................. 710/52; 710/57; 365/49.11; 709/213; 711/100; 712/204; 712/205; 712/217; 712/233; 712/237

(58) Field of Classification Search .................. 710/52; 712/204, 300, 205, 206, 207
See application file for complete search history.

(56) References Cited

U.S. PATENT DOCUMENTS

| 5,584,037 | A  | * | 12/1996 | Papworth et al. | 712/23 |
| 5,987,620 | A  | * | 11/1999 | Tran | 713/600 |
| 6,084,856 | A  | * | 7/2000 | Simmons et al. | 370/235 |
| 6,157,988 | A  | * | 12/2000 | Dowling | 711/140 |
| 6,233,629 | B1 | * | 5/2001 | Castellano | 710/29 |
| 6,745,265 | B1 | * | 6/2004 | Sindalovsky | 710/57 |
| 6,859,851 | B1 | * | 2/2005 | Sheaffer | 710/52 |
| 6,898,664 | B2 | * | 5/2005 | Matthews et al. | 711/112 |
| 7,017,030 | B2 | * | 3/2006 | Oldfield et al. | 712/207 |
| 2002/0053038 | A1 | * | 5/2002 | Buyuktosunoglu et al. | 713/320 |

* cited by examiner

Primary Examiner—Henry W. H. Tsai
Assistant Examiner—Michael Sun
(74) Attorney, Agent, or Firm—Lawrence J. Bassuk; W. James Brady; Frederick J. Telecky, Jr.

(57) ABSTRACT

A method and apparatus for adaptive buffer sizing adjusts the size of the buffer at different levels using a "high water mark" to different levels for different system conditions. The high water mark is used by the buffer logic as an indication of when to assert the buffer "Full" flag. In turn, the full flag is used by the instruction fetch logic as an indication of when to stop fetching further instructions.

8 Claims, 3 Drawing Sheets

FULL/SELECTOR OUTPUT FROM ONE OF PLURAL FLAG GENERATION COUNT OUTPUTS

FIELD OF THE INVENTION

The invention relates in general to the field of electronics and more specifically to a method and apparatus for adaptive buffer sizing.

BACKGROUND OF THE INVENTION

Buffers structures and their associated control logic are commonly used to absorb data delivery and consumption bandwidth discontinuities between a data generator and a data consumer. Examples of commonly implemented buffer structures include but are not limited to first-in-first-out (FIFO), last-in-first-out (LIFO) and stacks.

These buffer structures have implicit "costs" associated with their use, in addition to the obvious die area and power consumption of the structure itself. Usage of these buffer structures implies usage of system wide resources to make the buffer's effective. Common examples of system resources which a buffer implementation requires are system memory bandwidth to fill the buffer and local bandwidth to empty the buffer. This system and local memory bandwidth is commonly not available to other circuits if it is consumed by the buffer structure. Therefore consumption of this bandwidth is an associated cost of the buffer structure. There is also an associated power cost with the use of system and local memory bandwidth. Examples include power consumed by internal and external bus drivers to access main memory to fill the buffer structure, the power consumption of the main memory circuits themselves due to read and write access initiated by the buffer structure control logic and consumption of power by the clock and control circuits required to enable main memory access.

Buffer structure size is typically calculated by accounting for the absolute worst case scenario to determine the maximum size of the buffer. For example, the instantaneous absolute maximum difference between the data consumption rate and the data production rate will set the buffer size for any given implementation. Other examples include arbitration latency for system memory access, data path widths, interrupt servicing, etc. The buffer structure sizing must account for all possible scenarios, not matter how infrequent or unlikely, otherwise the system will fail to operate correctly in actual usage.

In some cases it is possible to predict the occurrence of these worst case scenarios in advance of their impact on the buffer itself and therefore reduce the associated implicit costs. An example of this is a system which implements a buffer structure to support bandwidth smoothing between an instruction fetch circuit and an instruction decode circuit. If this same system supports multiple, but exclusive, instruction size formats (i.e. instruction size can be set only during reset), then the buffer structure will be sized for the worst case bandwidth discontinuity in one of the instruction size formats. This buffer size will not necessarily be optimal for the alternate instruction size format. Yet the buffer structure will consume the same amount of system resources in both instruction size modes because the design has been constrained by the worst case scenario.

In FIG. 1 there is shown a prior art 2-way scalar pipeline in a multi-scalar design. Branch prediction and sequential address generation occurs in "A0". Branch resolution occurs nine stages later in "E3". The resolution determines if the prediction was correct or not. If a branch predicts incorrectly, pipe stages F1 thru E2 must be flushed and all of the instruction must be discarded. Power is consumed by each of the stages and flushed instructions represent wasted power since these instructions have been fetched and staged but never executed. In this example, power consumed by stages F2 through E2 increases linearly with increased pipe depth and parallelism. In this context an N-scalar design consumes N times the pipeline power of a 1-scalar design. Deeper pipelines consume power proportional to the increased pipeline depth.

In FIG. 2, a prior art diagram highlighting queue positions is shown. Buffers such as queues are used to smooth bandwidth discontinuities between various stages of a circuit. As mentioned previously, queues are typically sized in view of worst case scenarios. For processors that support multiple instruction sizes (e.g., ARM or Thumb processors designed by ARM, Ltd., x86 family processors designed by Intel, Inc., etc.) queues will be sized for worst case conditions for the largest instruction size. Historically buffer sizes have increased as design frequency increases, further exacerbating the problem.

Oversized queues result in wasted power on branch misdirection due to the fetching and staging of un-executed instructions. Processors with multiple instruction set sizes have over sized queues for the smaller instruction set sizes. This is due to the fact that larger instruction set size requires more storage in order to maintain the same performance target.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION OF THE PREFERRED EMBODIMENTS

Figure 1:
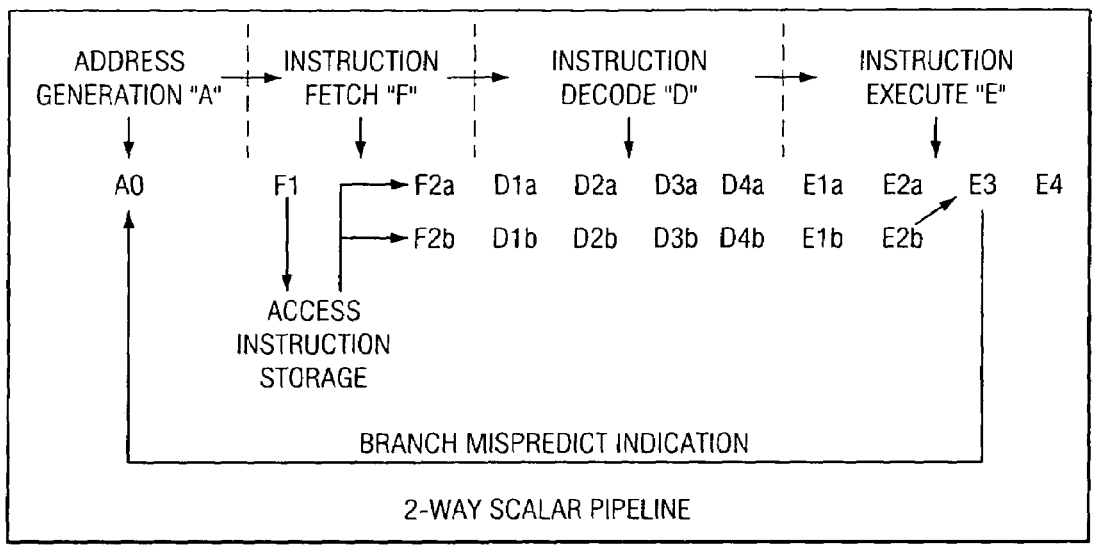
FIG. 1 shows a prior art 2-way scalar pipeline in a multi-scalar design.
Figure 2:
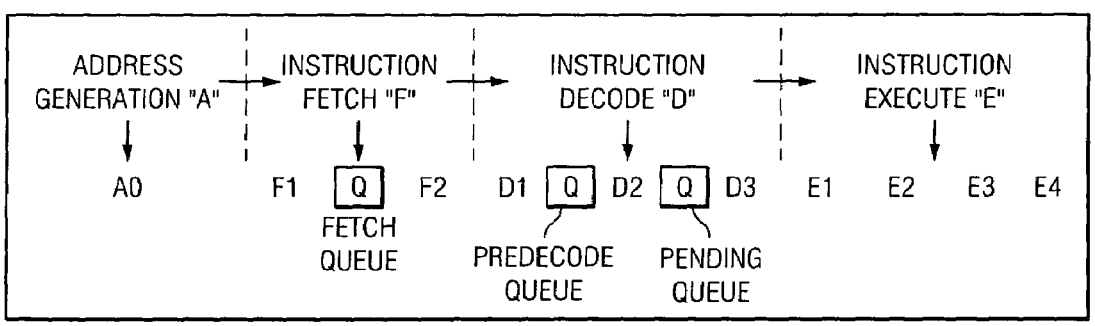
FIG. 2 shows a prior art diagram highlighting queue positions.

In accordance with an embodiment of the invention, the size of a buffer such as a queue is adaptively altered based on instruction set size and/or other factors, providing for a potential reduction in power while maintaining performance for all instruction sizes. A "watermark" (compare value) rather than an absolute (fixed) count of the number of used entries in the queue is used to determine when a queue is full. As an illustrative example, if a queue is sized to hold sixteen 32-bit instructions, the watermark is set to sixteen. When the instruction size is 16-bit, the queue now holds twice as many instructions than necessary, so the queue size watermark is adjusted to a value of eight.

The high watermark is used to generate a "full" (queue full) indication to the up-stream logic responsible for filling the queue. The "full" indication halts the upstream logic from adding further entries to the queue, therefore the apparent size of a queue can be adjusted by adjusting the watermark. In addition, in another embodiment of the invention, a method for adaptively adjusting the apparent queue size is also provided. The "queue full" indication is typically generated in prior art systems by detecting the number of entries currently in the queue. This can be done by comparing the read and write pointers of the queue, when the read address equals the write address, the queue is determined to be empty, while when the write address equals the read address minus 1, the queue is determined to be full.

Rather than comparing for (WriteAddress=ReadAddress−1) to generate the queue full flag as is typically done, the right hand side value (ReadAddress−1) is replaced with a watermark that can be controlled and therefore the assertion of the full flag becomes adaptive in accordance with an embodiment of the invention.

In one implementation, a register that can be set is added which contains the compare value (the watermark); this register is compared against the number of valid entries in the queue to determine when to stop filing the queue. Once the queue is adjustable, other parameters ("other factors") can be used to effect a change to the watermark. As an illustrative example, instruction set size, run-time branch miss prediction rate and pipeline stalls will cause an adjustment of queue size, which will provide for improved power consumption and performance.

A baseline watermark is set dependent on the native instruction queue size. As an illustrative example, for an ARM processor instruction set, the watermark is set to its maximum value, effectively setting the instruction queue to hold twelve 32-bit instructions (6 entries in 4 slices with each slice containing 16-bits). It should be noted that the maximum value of the watermark can be changed depending on given design requirements. In a particular embodiment when a Thumb processor (another ARM, Ltd. Processor) instruction set is used, the queue size is adjusted such that it holds approximately the same number of instructions. The "Thumb mode" uses a 16-bit instruction set, so 3 entries in 4 slices of 16-bits each equates to 12 instructions. Without the benefit of the adaptive queue sizing technique in accordance with an embodiment of the invention, the queue used for the Thumb instruction set would contain 24 Thumb instructions, twice the optimal size. The "Thumb2" mode uses a mixture of 16-bit and 32-bit instructions; therefore the queue size is set to ¾ the value in one illustrative embodiment, i.e., 4 entries in 4 slices of 16-bits each. This optimally sets the initial queue size to minimize the potential waste represented by the pre-fetched instructions which are flushed due to branch misdirection. Thus, an embodiment of the invention comprises a processor circuit supporting multiple instruction set sizes, and a circuit for adjusting an adjustable compare value (watermark) if a change in instruction set size occurs.

As a further enhancement to the invention, as instruction execution proceeds, branch misdirection may be indicated. Mis-prediction requires a flush of the instruction queue. In one implementation, the results of the mis-prediction algorithm are recorded in a storage device such as a small shift register of 8-16 bits which holds the state of the mis-predict signal (MissPredict) for each executed branch, the size of the storage device can be modified depending on the design requirements. For each of the 8-16 branches, if the number of mis-predicted branches exceeds the number of correctly predicted branches by a factor of two, the high watermark is adjusted downward by one entry. The adjustment of the watermark may be limited to a minimum of one entry or a maximum of the value of the baseline watermark. The watermark adjustment can be accomplished for example using a multiplexer select signal, with the output of the multiplexer being the high watermark. The watermark signal is coupled to a comparator that checks it against the number of entries in the queue versus the number of desired entries as indicated by the watermark. This comparison controls the assertion of an IQ "full flag". A full indication by the IQ effectively halts further instruction fetches until entries have been read by the instruction decode unit.

Other examples events that can modify the watermark (compare value) include the instruction pending queue present in an Instruction Decode Unit. This queue holds partially decoded instructions (this is a natural part of its operation) which force the machine into single scalar operation and strong order dependency. In this condition, the pending queue size is nearly twice as large as needed. While these serialization instructions are being resolved, up stream logic can still attempt to keep the pending queue as full as possible even through in reality these instructions can be flushed form the pending queue on a machine check (e.g., a branch mis-prediction, or other breaks in the instruction stream). Again, dynamically adjusting the apparent queue size results in power savings and reduction of wasted memory bandwidth. In addition, the instruction pending queue is also flushed on a branch mis-prediction and therefore benefits from the same mechanism as previously outlined.

Figure 3:
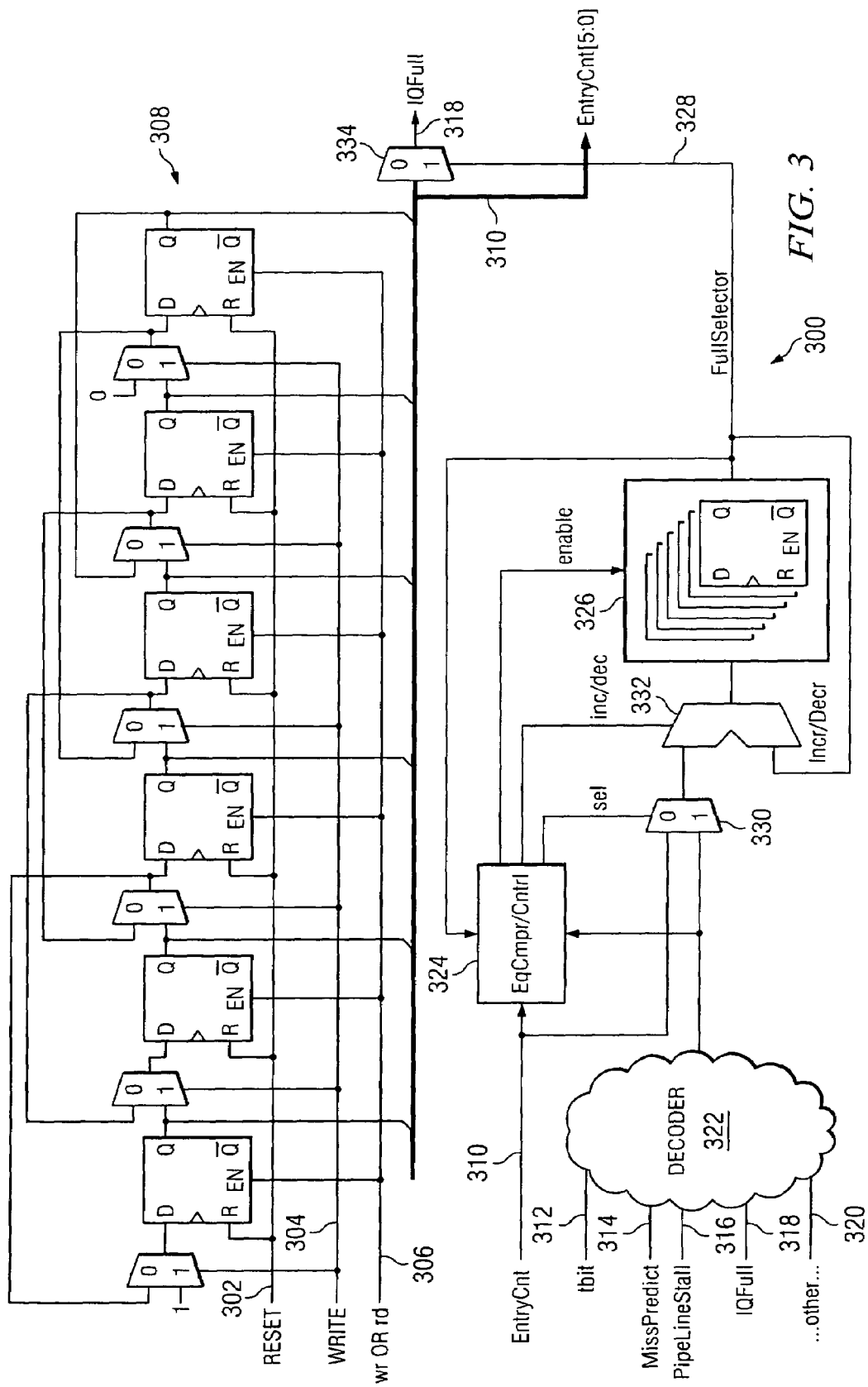
FIG. 3 shows a block diagram of an adaptive queue sizing circuit in accordance with an embodiment of the invention.

Referring now to FIG. 3, there is shown a block diagram of an adaptive queue sizing pointer and control circuit 300 in accordance with an embodiment of the invention. The circuit 300 includes a First-In-First-Out (FIFO) full/empty flag generation circuit 308 comprising a shift register including a plurality of flip-flops. The FIFO full/empty flag generation circuit 308 is used to track the number of valid instruction queue entries. Reset 302, WRITE 304 and write OR read (wr OR rd) 306 control signal lines are coupled to each of the flip-flops 308. The wr OR rd control signal 306 provides an enable signal to the flip-flops 308 depending if a WRITE or a READ instruction has occurred. After being reset, all of the flip-flops 308 register "0". Whenever there is a write operation, a "1" in one embodiment is shifted into the left most flip flop, and the output of each flip-flop is shifted into the successive right flip flop. Whenever there is a read operation a "0" is loaded onto the right most flip-flop, so if there are two consecutive read operations, the two rightmost flip-flops shown in FIG. 3 have a output value of "0".

The value of EntryCnt is the current state of the FIFO. EntryCnt 310 includes a set of contiguous 1's beginning at the left followed by a set of contiguous 0's. It is possible for EntryCnt 310 to be all 1's (the complete full state) or be all 0's, (the complete empty state). EntryCnt 310 is used by EqCmpr/Cntrl 324 to determine whether FullSelector 328 can be altered. EqCmpr/Cntrl 324 compares the current value of EntryCnt 310 with the output of decoder 322.

Figure 4:
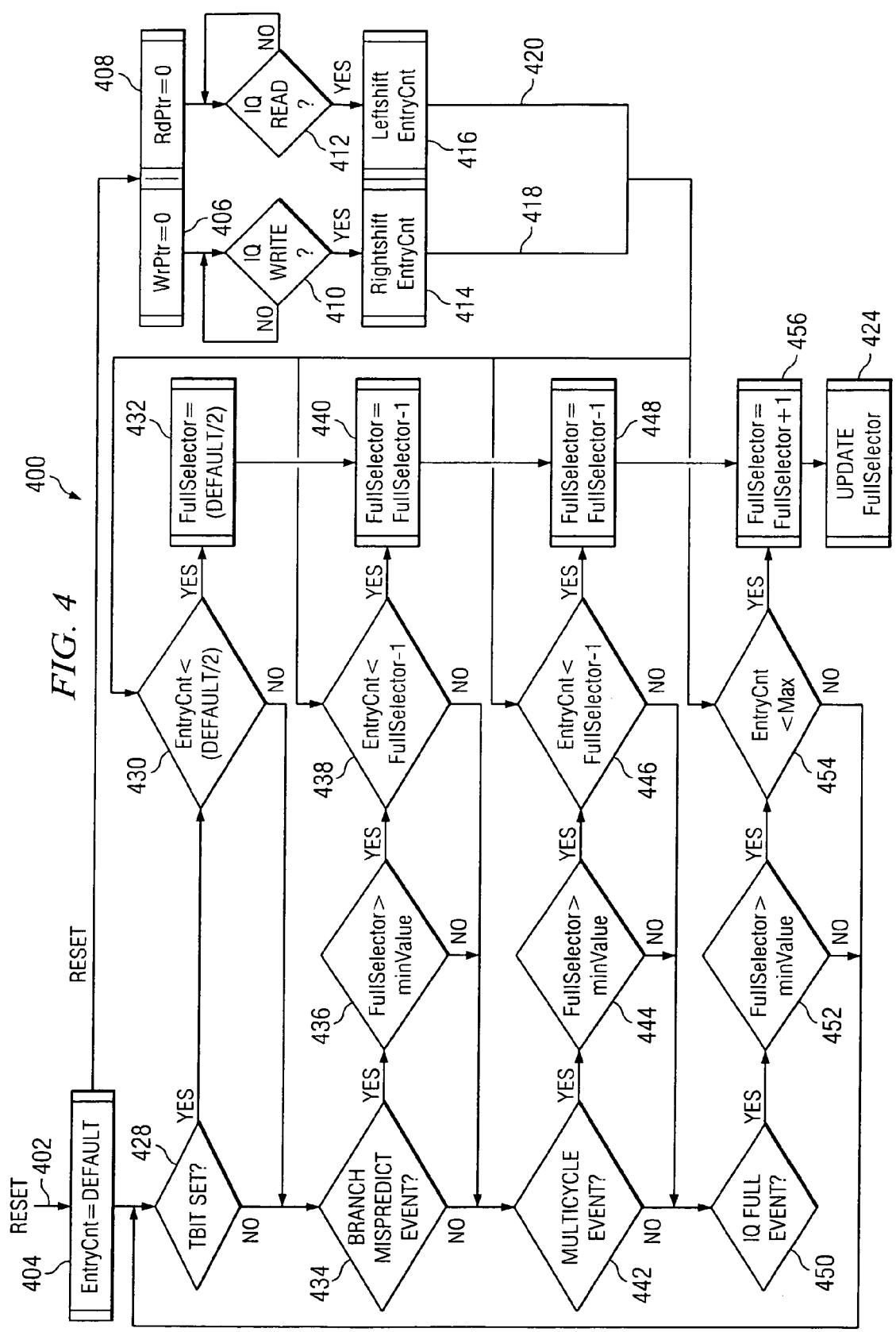
FIG. 4 shows a flowchart of an adaptive queue sizing technique in accordance with an embodiment of the invention.

The output of decoder 322 is the decoding that determines whether the watermark (FullSelector) should be altered or left unaltered. Decoder 322 tracks system events such as miss-predicts, instruction size, pipe stall, etc. Based on these events, decoder 322 determines the target watermark. This target watermark is qualified by EqCmpr/Cntrl 324 to determine if the current watermark can be altered towards the target watermark. FIG. 4 shows the flow diagram which determines whether the current watermark can be altered towards the target watermark.

If the adjustment of the current watermark is permitted, the EqCmpr/Cntrl 324 logic 324 asserts/deasserts the inc/dec (increment/decrement) signal, deasserts the sel (select) signal and asserts the enable signal. Depending on the output of decoder 322, the current watermark is adjusted up or down, based on whether the target watermark is greater or less than the current watermark. In cases where the EqCmpr/Cntrl circuit 324 determines the output of decoder 322 can simply be copied to the FullSelector value, EqCmpr/Cntrl 324 asserts inc/dec, asserts the "sel" signal and asserts the enable signal. (There is an implied convention that the decoder's 322 output is always −1 of it's desired value, therefore EqCmpt/Cntrl's 324 assertion of "inc" (i.e. increment) will cause the FullSelector value 328 to be the appropriate target value.) The purpose of FullSelector 328 is to select the appropriate bit from EntryCnt 310 and supply that bit's state to the value of IQFull. This circuit permits any bit of EntryCnt to potentially be the full flag, IQFull 318. This implements the adaptive queue sizing function.

The watermark (also referred to as a compare value) previously discussed is generated by the portion of circuit 300 shown at the bottom of FIG. 3 and includes a decoder 322 which receives as inputs in this illustrative embodiment a "tbit" or sum bit that informs the decoder 322 if the instructions are either 16-bit or 32-bit. In one embodiment, if the instructions are 16-bit, the tbit signal has a value of "1" and if the instructions are 32-bit, the tbit has a value of "0". If a mis-prediction occurs, a logical "1" is provided to the decoder 322 via a Misspredict control signal 314. Other variables that can be used to modify the watermark value include pipeline stall which decoder 322 is made aware of by a logical "1" value being provided by the PipeLineStall control signal 316. If the instruction queue is full, the IQFull control signal 318 is provided to the decoder 322 by the FullSelector signal 328 enabling switch 334. The tbit 312, Misspredict 314, PipeLine Stall 316 and "other" events 320 signals are provided by the system circuitry that is not shown in order to focus on the present invention. For example, these signals 312-316 and 320 can originate from a processor circuit board, etc.

Referring now to FIG. 4, there is shown a flowchart 400 highlighting some of the steps taken in order to provide adaptive queue sizing in accordance with an embodiment of the invention using the circuit 300 previously discussed. A reset signal 402 resets FullSelector and sets its value to a default value as well as resets EntryCnt. The default value of FullSelector can vary depending on a given system implementation and its requirements. The FullSelector in conjunction with 334 act as the adaptive watermark for a queue as shown in FIG. 3.

In 410, it is determined if an IQ write has occurred and in the decision step 412 it is determined if an IQ read had occurred. If an IQ write has occurred, a right shift is initiated in circuit 308. Conversely, if an IQ read has occurred, a left shift is initiated in 308. As previously mentioned, a right shift moves the state of a left-hand flip-flop to its right hand neighbor and since the left most flip-flop input is tied to a logic one, this right hand shift operation effectively moves a "train" of contiguous 1's to the right, conversely 0 and left shift for IQ reads. A simultaneous IQ read and IQ write leaves EntryCnt unchanged.

In 422, the value of EntryCnt is determined by resolving the left/right shift requirements of IQ reads and writes. The EntryCnt value is then used, in conjunction with decoder 322 output, to determine the adjustment of FullSelector. FullSelector, in turn adjusts which bit of EntryCnt is applied to IQ Full 318.

In accordance with an embodiment of the invention FullSelector is adapted to changing system condition based on the decision made in the left side of the flowchart 400 as shown in FIG. 4. In this illustrative example, multiple system activities affect the value of the FullSelector or watermark which is used to determine if the queue full (IQFull) flag should be asserted. In decision step 428, it is determined if a TBIT is set or not. In this example, if the TBIT is set (e.g., a logical one), it indicates that the instruction set is set at 16-bit and if the TBIT is not set, it indicates that the instruction set is operating at 32-bit. As previously mentioned, by adjusting the queue's watermark based on changes in instruction size, the queue's power consumption may be improved. Depending on the particular system the routine is operating in, if the system is capable of supporting multiple instruction sizes (e.g., 8-bit, 16-bit, etc.), the FullSelector (watermark value) can be adjusted depending on the particular instruction size that is being used. If a system supports more than two instruction sizes, it may require multiple flags (like the TBIT flag), or a flag having multiple bits. The TBIT flag is provided by the system (not shown).

If it is determined in decision step 428 that the TBIT is set, the process goes to step 430, where it is determined if an instruction queue entry count (EntryCnt) is less than the Default value divided by 2 (EntryCnt<(DEFAULT/2). If it is, then the FullSelector is set equal to the DEFAULT value divided by 2 (FullSelector=(DEFAULT/2) causing the watermark to be cut in half. If in step 430, it is determined that the EntryCnt is not less than (DEFAULT/2), then the routine moves to step 434. In decision step 434, it is determined if a branch mispredict event has occurred. If a mispredict has occurred, in 436 it is determined if the FullSelector is less than a minimum value (FullSelector>minValue).

The minValue can be the lower threshold watermark for the system and can be a predetermined value that is selected by the system designer or system user as an example. If the FullSelector is greater than the minValue, in step 438 it is determined if the EntryCnt<FullSelector−1, if it is, in 440, the FullSelector is set equal to FullSelector−1. If in 438, EntryCnt is not less than FullSelector−1, the routine goes to 442. In 442 it is determined if another event that can cause the FullSelector (watermark) to change a multicycle event has occurred. If a multicycle event has occurred, in 444 it is determined if the FullSelector>minValue. If the FullSelector is determined to be greater than the minValue in 444, then in 446 it is determined if EntryCnt<Fullselector−1, if it is, then Fullselector is set equal to Fullselector−1 in 448. If in step 446 it is determined that EntryCnt<Fullselector−1, the routine moves to step 450 to determine if an IQ full event has occurred. This event is caused by the queue that is being monitored reaches a full condition. If an IQ full event has occurred in 450, it is determined in 452 if Fullselector>minValue. If the Fullselector>minValue in 454, it is determined if EntryCnt<Max in 454. The Max value is an upper threshold for the system. If EntryCnt<Max then in 456 the Fullselector is set equal to the Fullselector+1 and the routine moves to 424 were Fullselector is updated. If in 454 it is determined that EntryCnt is not less than Max, the routine moves to step 428.

Figure 5:
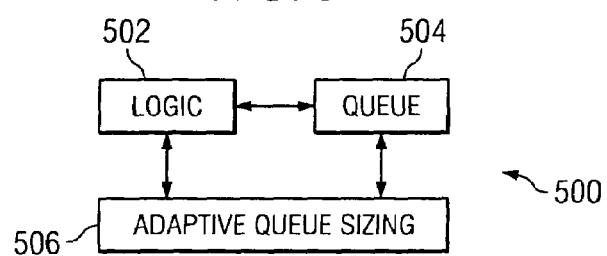
FIG. 5 shows a diagram highlighting the interaction of the adaptive queue sizing, queue and logic in accordance with an embodiment of the invention.

In FIG. 5, there is shown a block diagram 500 highlighting the interaction between a system's logic 502, the queue 504 that is storing information provided by logic 502 and the adaptive queue sizing circuitry 506 discussed above. By receiving changes (e.g., mis-prediction event occurring, changes to the instruction set bit size, etc.) in operating conditions form logic 502 the adaptive queue sizing block can make adjustments to the queue's watermark that helps determine if the queue is full or not With the use of the present invention, queue sizes can be adjusted in order to allow the queues to be operated in a more power and bandwidth efficient manner (i.e., instruction set sizing). Also, adjusting the queue size based on run time events such as mis-predictions, stall, serialization instructions, etc. mitigates the waste in bandwidth and power caused by over specification of queue size, yet permits maximum performance when run time events such as stalls are not present. Finally, an outcome of the adjustment mechanism can permit programmatic control of queue sizes for the purpose of trading performance against power consumption in low power conditions or to extend battery life.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, the invention can be utilized in many environments not only those associated with instruction queues and pending queues as discussed in some of the embodiments above. By dynamically altering the apparent size of a queue, memory bandwidth and power can be saved. The dynamic altering of the apparent size of a queue also helps avoid "overfilling" queues which are typically underutilized.

What we claim as our invention is:

1. Control circuitry comprising:
   A. flag generation circuitry having a reset input lead, a write input lead, an enable input lead, and plural count output leads, in which the flag generation circuitry includes:
      a. a series connection of D-type flip-flops and multiplexers,
      b. each flip-flop having a D input, a reset input, an enable input, and a Q output,
      c. each multiplexer having first and second inputs, a control input connected to the write input lead, and an output connected to the D input of a flip-flop, and
      d. the reset input of all the flip-flops being connected to the reset input lead, the enable input of all the flip-flops being connected to the enable input lead, the Q outputs being connected to the plural count output leads;
   B. switch circuitry having plural inputs connected to the plural count output leads, a queue full output, and a Full/Selector input, the switch circuitry coupling one of the plural inputs to the queue full output in response to a control input; and
   C. comparator circuitry having a Full/Selector output connected to the Full/Selector input of the switch circuitry.

2. The control circuitry of claim 1 in which the comparator circuitry includes decoder circuitry having a queue full input connected to the queue full output.

3. The control circuitry of claim 1 in which the comparator circuitry includes decoder circuitry having a tbit input indicating the size of instruction words.

4. The control circuitry of claim 1 in which the comparator circuitry includes decoder circuitry having a MissPredict input indicating the occurrence of a missed predicted branch.

5. The control circuitry of claim 1 in which the comparator circuitry includes decoder circuitry having a PipeLineStall input indicating the occurrence of a pipeline stall.

6. The control circuitry of claim 1 in which the comparator circuitry includes decoder circuitry having a queue full input connected to the queue full output, a tbit input indicating the size of instruction words, a MissPredict input indicating the occurrence of a missed predicted branch, and a PipeLineStall input indicating the occurrence of a pipeline stall.

7. The control circuitry of claim 1 in which the comparator circuitry includes:
   i. decoder circuitry having target watermark outputs,
   ii. EqCmpr/Cntrl circuitry having one set of inputs connected with the plural count output leads, target watermark inputs connected to the target watermark outputs, and an enable output, and
   iii. Full/Selector circuitry having an enable input connected to the enable output of the EqCmp/Cntrl circuitry and the Full/Selector output.

8. The control circuitry of claim 1 in which the flag generation circuitry includes:
   a. a series connection of plural D-type flip-flops and multiplexers,
   b. each flip-flop having a D input, a reset input, an enable input, and a Q output connected to a count output lead,
   c. each multiplexer having first and second inputs, a control input connected to the write input lead, and an output connected to the D input of a flip-flop,
   d. the reset input of all the flip-flops being connected to the reset input lead, the enable input of all the flip-flops being connected to the enable input lead, the Q outputs being connected to the plural count output leads,
   e. the first multiplexer in the series having the first input connected to a high logic value and the second input connected to the D input of a succeeding flip-flop,
   f. the last multiplexer in the series having the first input connected to the Q output of a preceding flip-flop and the second input connected to a low logic value,
   g. the second to the last multiplexer having the first input connected to the Q output of a preceding flip-flop and the second input connected to the Q output of the last flip-flop, and
   h. the remaining multiplexers having the first input connected to the Q output of a preceding flip-flop and the second input connected to the D input of a succeeding flip-flop.

* * * * *

UNITED STATES PATENT AND TRADEMARK OFFICE
CERTIFICATE OF CORRECTION

PATENT NO. : 7,587,532 B2 Page 1 of 1
APPLICATION NO. : 11/047410
DATED : September 8, 2009
INVENTOR(S) : Nye et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Twenty-first Day of September, 2010

David J. Kappos
*Director of the United States Patent and Trademark Office*